June 16, 1953  A. McDONALD ET AL  2,641,799
APPARATUS FOR EXTRUDING PELLETS
Filed May 15, 1950
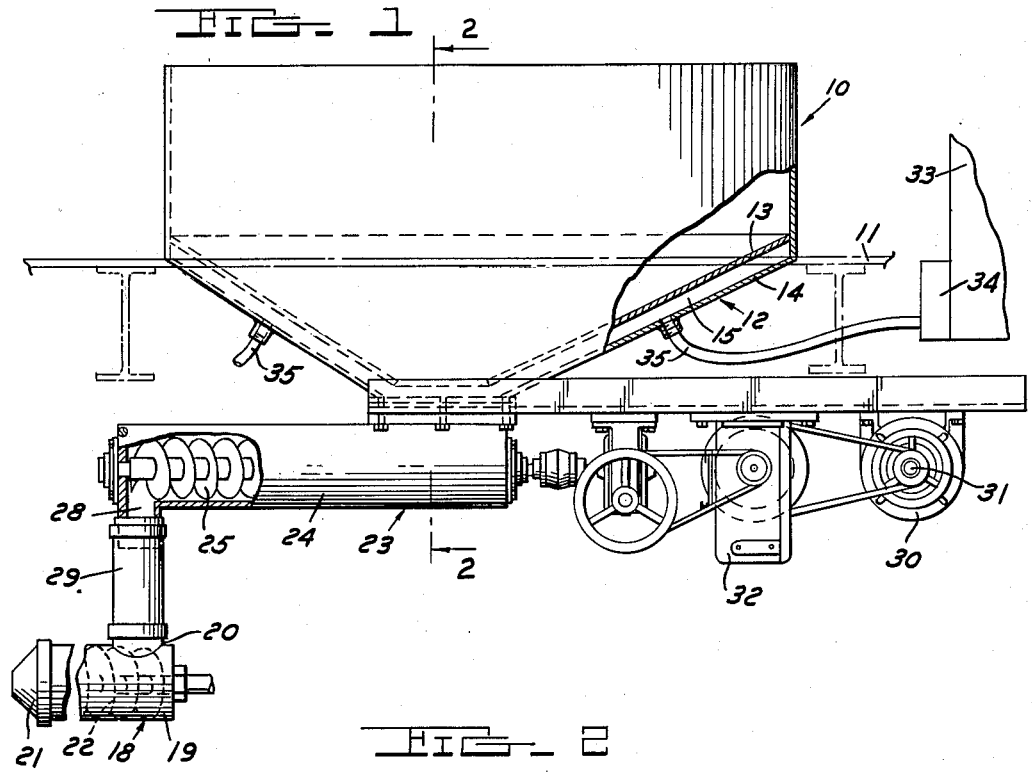
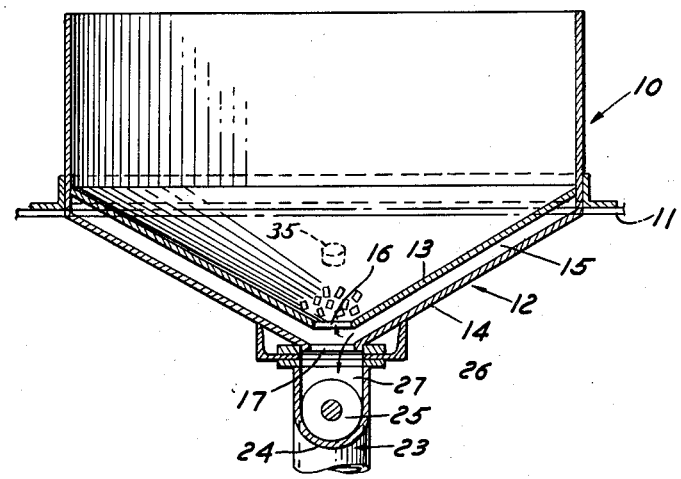
INVENTOR.
ANGUS McDONALD
JOHN R. STROBEL
BY
ATTORNEYS Patented June 16, 1953

2,641,799

UNITED STATES PATENT OFFICE 2,641,799

APPARATUS FOR EXTRUDING PELLETS

Angus McDonald and John R. Strobel, Pontiac, Mich., assignors to Baldwin Rubber Company, Pontiac, Mich., a corporation of Michigan Application May 15, 1950, Serial No. 161,948

2 Claims. (Cl. 18—1)

This invention relates generally to equipment for extruding heat softenable stock such as rubber, synthetic rubber or other vulcanizable materials, and refers more particularly to apparatus for extruding pellets of said stock.

It is an object of this invention to provide apparatus having means for supplying pellets to an extruding device and having means for warming or heating the pellets prior to introducing the same to the extruding device so that the stock possesses the pliability required for efficient extruding action.

It is an other object of this invention to provide a hopper having an opening at the bottom through which pellets are discharged, and having means for flowing a gaseous heating medium upwardly through the opening in heat transfer relation to the pellets, passing through the outlet opening. In accordance with this invention the hopper has spaced bottom walls cooperating to form a jacket and has registering outlet openings through the bottom walls. The jacket is connected to a source of gaseous heating medium in a manner such that the heating medium flows in heat transfer relation to the bottom walls of the hopper as it passes to the outlet openings. Thus the walls of the hopper are heated either directly or indirectly by the gaseous heating medium and the pellets within the hopper are also heated to some extent before coming in direct contact with the heated gaseous medium passing upwardly into the hopper through the registering outlet openings.

It is still another feature of this invention to provide pellet extruding apparatus having an extruding device and having a feeder extending from the extruding device to the hopper. The feeder is positioned to receive heated pellets directly from the hopper and is equipped with means for positively feeding the pellets at the proper rate to the extruding device.

The foregoing as well as other objects will be made more apparent as this description proceeds, especially when considered in connection with the accompanying drawing, wherein:

Figure 1 is an elevational view partly in section of an apparatus for extruding pellets in accordance with this invention; and Figure 2 is a sectional view taken substantially on the line 2—2 of Figure 1.

When extruding rubber or materials having characteristics similar to rubber to form certain end products, it is customary to employ pellets or relatively small particles of the selected plastic material. In cases where the product is formed of rubber, synthetic rubber or a similar heat softenable material, pellets of the uncured material are introduced into the extruding device, and are forced through a die having the required contour. In order to obtain the best results from such an extruding operation, the uncured pellets should be in a pliable condition when subjected to the action of the extruding device.

It has been the practice in the past to soften sheets of rubber or other plastic material by a milling operation just prior to forming the sheets into pellets, and to introduce the pellets into the extruding device while the material is in a softened condition. This procedure is objectionable not only because of the cost involved in providing the necessary milling operation, but also because it is not always convenient or possible to use the pellets before the material loses the effect of the milling operation.

In accordance with the present invention the pellets are warmed or heated just prior to feeding the same to the extruding device, so that they possess the pliability required for efficient extruding action. Thus the extra milling operation may be dispensed with, and the pellets may be stored for a reasonable length of time before they are actually used in the extruding equipment.

With the above in view, reference is now made more in detail to the drawing, wherein the numeral 10 designates a hopper preferably formed of sheet metal and suitably supported on frame structure 11. The hopper is open at the top for receiving a supply of pellets, and the bottom wall 12 of the hopper is apertured at the central portion thereof to enable the pellets to discharge from the hopper. In the present instance the bottom wall 12 of the hopper is provided with an inner wall section 13 and an outer wall section 14 spaced vertically from each other to provide a jacket 15 therebetween. As shown particularly in Figure 2 of the drawing, the inner wall section 13 has a central opening 16 and the outer wall section 14 has a central opening 17 arranged in vertical alignment with the opening 16 to enable free passage of the pellets therethrough. It will also be noted that the inner and outer wall sections taper downwardly from the sides of the hopper to the central openings in order to permit the pellets to discharge by the action of gravity from the hopper.

The pellets discharged from the hopper are introduced into an extruding device 18 which may be of any suitable construction and is therefore not shown in detail herein. In general the extruding device has a casing 19 formed with an entrant opening 20 adjacent the rear end for receiving pellets, and having a die 21 at the front end thereof. The pellets introduced into the casing 19 are forced axially of the casing through the die 21 by a suitable screw 22 rotatably supported within the casing 19 and connected to suitable driving mechanism not shown herein.

The pellets are conveyed from the hopper to the extruding device 18 by a feeder 23 comprising an elongated casing 24 and a feed screw 25 rotatably supported within the casing. The rear end of the casing is secured to the bottom of the hopper 10 by a coupling 26 and is fashioned with a vertical passage 27 which extends downwardly from the outlet opening 17 to the rear end of the feed screw 25. The front end of the casing 24 has a delivery passage 28 which is connected to the inlet opening 20 of the extruding device 18 by a vertical conduit 29.

The feed screw 25 is driven by a prime mover in the form of an electric motor 30 having a drive shaft 31 suitably connected to the rear end of the feed screw 25 by a variable speed driving mechanism 32. The driving mechanism 32 enables varying the speed of rotation of the feed screw 25 and assures delivery of the required amount of stock to the extruding device.

It will be noted from the foregoing that pellets from the hopper 10 drop by gravity into the rear end of the feeder 23, and are positively fed by the screw 25 forwardly along the casing 24 to the delivery opening 28 in the casing 24. From the delivery opening 28, the pellets drop by gravity into the receiving end of the casing 19 and the pellets are forced by the screw 22 through the die 21 to form the desired extruded product.

Also in accordance with the present invention the stock or pellets within the hopper 10 are warmed or heated prior to being introduced to the feeder 23. For this purpose air or some other gaseous medium at elevated temperatures is introduced into the jacket 15 formed by the two wall sections 13 and 14 at the bottom of the hopper. This jacket is closed at the outer sides thereof by the side walls of the hopper and opens at the center into the aligned openings 16 and 17. Thus the gaseous heating medium is compelled to flow downwardly in the jacket to the openings 16 and 17. Some of the heating medium may pass downwardly into the feeder 23, but the majority flows upwardly into the hopper through the opening 16. The flow of heating medium upwardly through the opening 16 directly heats the pellets as they pass downwardly through the opening 16, and renders the pellets sufficiently pliable for the subsequent extruding operation which takes place before the pellets have an opportunity to cool. Also the pellets are heated to some extent indirectly by reason of the fact that the heating medium circulated within the jacket 15 raises the temperature of the walls of the hopper 10.

In the present instance the heating medium is supplied under sufficient pressure to create turbulence in the region of the outlet opening 16, and in some instances, may actually cause the pellets coming in contact with the stream of the heating medium to blow upwardly from the discharge opening 16 in the manner indicated in Figure 2. This action, however, is not sufficient to materially retard the flow of pellets from the hopper into the feeder 23.

Referring again to Figure 1 of the drawing, it will be noted that the reference character 33 represents a source of gaseous heating medium, and the numeral 34 designates a blower which is connected to the jacket 15 by conduits 35. This arrangement is merely diagrammatically indicated for the purpose of illustration, and may of course be varied to suit different conditions. In any case the gaseous heating medium is introduced under pressure into the jacket 15, and is discharged into the hopper 10 through the outlet opening 16 for the pellets so as to effectively heat or warm the pellets just prior to the extruding operation.

What we claim as our invention is:

1. In apparatus for extruding pellets of heat softenable material, an extruding device, means for supplying pellets to the extruding device including a hopper having an outlet opening at the bottom through which pellets are discharged by the action of gravity and having a bottom wall converging toward the outlet opening for directing the pellets to said opening, means for flowing a gaseous medium at elevated temperatures in an upward direction through the discharge opening at the bottom of the hopper with sufficient force to retard passage of pellets through said opening and create a turbulence in the region of the discharge opening, said means including a second wall spaced from the bottom wall to provide a jacket between said walls and having an opening registering with the discharge opening in the bottom wall of the hopper, and a supply conduit for the gaseous heating medium communicating with the jacket at a point spaced from the registering openings through said walls whereby gaseous heating medium flowing from the supply conduit to the registering openings passes in heat exchange relationship to the bottom wall of the hopper.

2. In apparatus for extruding pellets of heat softenable material, an extruding device, means for supplying pellets to the extruding device including a hopper having an outlet opening in the bottom portion thereof through which pellets are discharged by the action of gravity, means for flowing a gaseous medium at elevated temperatures in an upward direction through the outlet opening of said hopper with sufficient force to retard passage of pellets through said opening and create a turbulence in the region of said opening, said means including a wall surrounding the bottom portion of said hopper in spaced relation thereto to provide a jacket and having an opening registering with the outlet opening of said hopper, and a supply conduit for the gaseous heating medium communicating with the jacket at a point spaced from the registering openings whereby gaseous heating medium flowing from the supply conduit to the registering openings passes in heat exchange relationship to the bottom portion of the hopper.

ANGUS McDONALD.
JOHN R. STROBEL.

References Cited in the file of this patent

UNITED STATES PATENTS

| Number | Name | Date |
| --- | --- | --- |
| 1,361,346 | Nichols | Dec. 7, 1920 |
| 2,103,546 | Morrell | Dec. 28, 1937 |
| 2,295,942 | Fields | Sept. 15, 1942 |
| 2,336,159 | Bent | Dec. 7, 1943 |